Oct. 10, 1939.    A. I. EDDY    2,175,686
DRY CELL
Filed Nov. 20, 1935
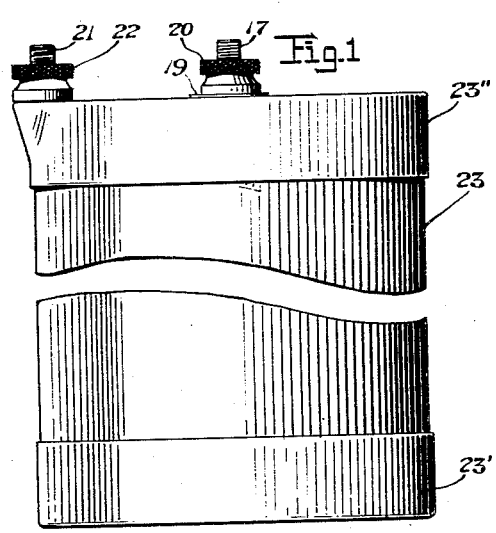
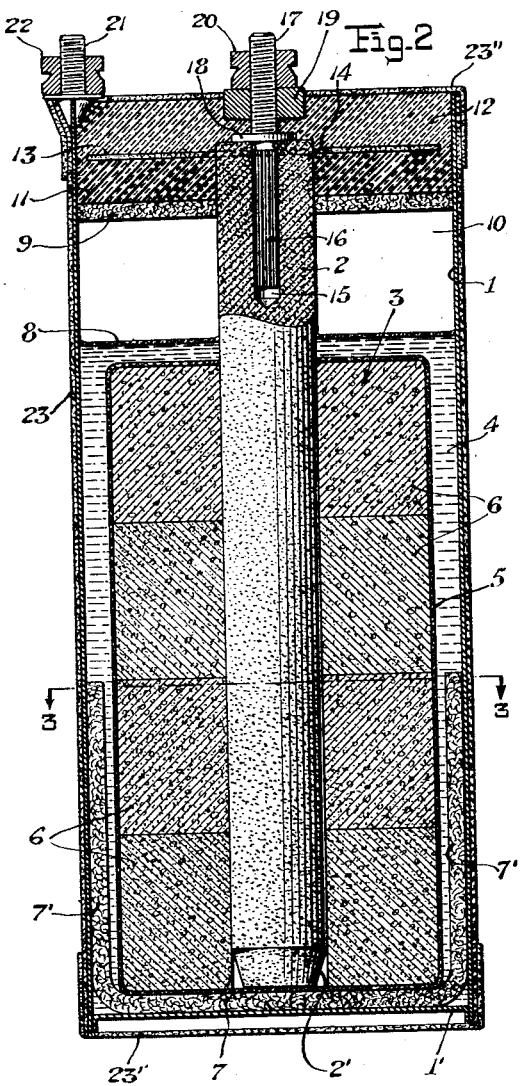
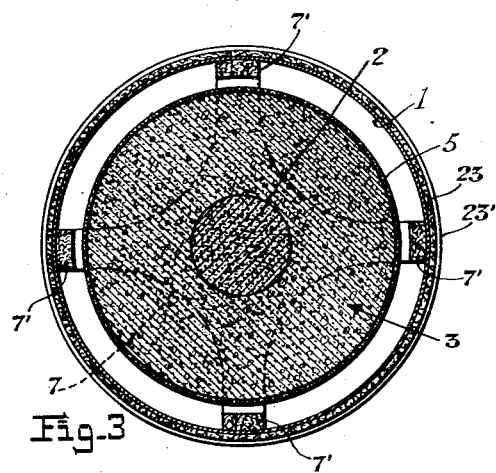
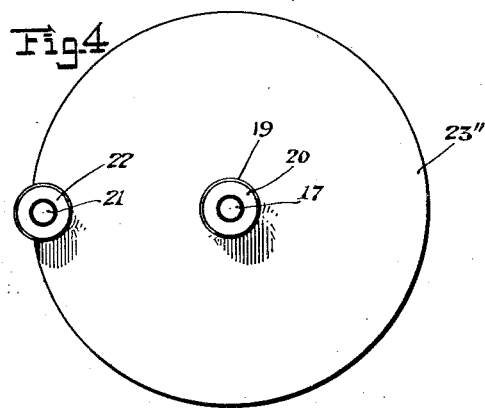
Inventor
Albert I. Eddy
By Henry Lanahan
Attorney Patented Oct. 10, 1939

2,175,686

UNITED STATES PATENT OFFICE 2,175,686

DRY CELL

Albert I. Eddy, West Caldwell, N. J., assignor to Thomas A. Edison, Incorporated, West Orange, N. J., a corporation of New Jersey Application November 20, 1935, Serial No. 50,623

2 Claims. (Cl. 136—133)

My invention relates to dry cells and more particularly to dry cells of the type wherein a mass of depolarizing material closely envelopes a carbon rod forming one of the electrodes of the cell and wherein said mass and rod are disposed within a zinc container forming the other electrode of the cell and an electrolyte usually incorporated in a paste, fills or partially fills a space provided between the zinc container and the depolarizing material and carbon rod.

It is well known that a dry cell of this character liberates gases internally, particularly when discharging a substantial amount of current; these gases being given off or liberated, for the most part, from the active materials or elements comprising the electrolyte and depolarizing materials. During subsequent periods of comparative inactivity of the cell, these gases are reabsorbed to some extent, dependent upon the effectiveness of the sealing means provided for the cell. Also to some extent, the liberated gases penetrate and leak past the sealing means, where the latter is of ordinary construction, and escape to the outside of the cell. It is common practice in the art to provide such a cell with a more or less free space or expansion chamber near the top thereof, within which space gases formed and liberated from the active materials of the cell during discharge thereof, may accumulate to be later reabsorbed in part by such active materials and to escape to some extent past the usual outer seal of the cell. In previous forms of construction, moisture has been as free to escape from the active materials of the cell into the expansion chamber referred to as have been the gases formed during discharging of the cell. While, as above indicated, it has been customary to provide ordinary dry cells with outer or top seals, the seals heretofore provided have been more or less unsatisfactory with the result that gases and moisture which escaped from the active materials of such a cell into the expansion chamber, were in danger of leaking through or past the outer seal to the outside of the cell. The escape of such internal moisture is highly objectionable, for a cell in which this occurs to a considerable extent will obviously "dry out" in a comparatively short time and will have a correspondingly restricted useful life.

One of the principal objects of my invention, is to provide an improved seal construction for dry cells whereby the escape of internal moisture from the cells is almost entirely prevented or at least very greatly restricted, so that the cells will have a maximum useful life.

Another object of my invention is to provide a terminal connection of improved construction for the central electrode of a dry cell, which connection is especially applicable to and advantageous in the case of a cell having an outer seal of the general character of that hereinafter described and a central carbon or other electrode terminating within said seal.

Further objects and features of my invention will appear from the following description when read and considered in conjunction with the accompanying drawing, wherein:

Fig. 1 is a view in side elevation, partly broken away, of one form of dry cell constructed in accordance with my invention;

Fig. 2 is a central vertical sectional view, partly in elevation, of the cell shown in Fig. 1;

Fig. 3 is a sectional view on line 3—3 of Fig. 2; and

Fig. 4 is a plan view of the cell shown in Fig. 1.

Referring to the drawing, the cell shown comprises a cylindrical zinc can or container 1 forming the positive electrode element of the cell, a carbon rod 2 disposed centrally in the container 1 and forming the negative electrode element of the cell, a mass or body 3 of suitable depolarizing material enveloping the rod 2, and an electrolyte paste 4 disposed in the space between the container 1 and the depolarizing mass. This depolarizing mass is preferably covered by or encased in a cloth or paper wrapping or sleeve 5.

The carbon rod 2 together with the enveloping mass 3 of depolarizing material and the cloth or paper wrapping or bag 5 for the latter, constitute the electro-negative or depolarizing electrode assembly of the cell, which assembly may be and preferably is constructed and assembled as follows:

The carbon rod 2 is of the usual cylindrical form except that it is provided with a reduced bevelled lower end portion 2'. The depolarizing mass may be made of a conventional mixture of finely divided materials including manganese dioxide and graphite agglomerated under pressure to a dense coherent form. While the depolarizing body 3 may be in the form of a single block, it is preferably made up of a number of similar superimposed cylindrical annular blocks or discs 6 each having a central opening of substantially the same diameter as the carbon rod 2. In forming the composite body of depolarizing material, a suitable number of the discs or blocks 6 are superimposed and then either wrapped with cloth or paper or pushed into a close fitting cloth or paper bag or sleeve. If the superimposed depolarizing blocks are to be wrapped, they are disposed on a suitable mandrel and while rotated, have wound thereon a tape or ribbon of cloth or paper until completely enclosed. Upon the completion of this winding operation the exposed end of the tape is thrust downwardly into the central opening of the block assembly. In case the depolarizing mass is to be enclosed in a cloth or paper bag or sleeve, the superimposed depolarizing block assembly is pushed into such a bag or sleeve designed to closely fit the same, and the ends of the sleeve or bag are sewn in so as to totally enclose the underlying material. The carbon rod 2 is then forced through the aligned central openings of the blocks 6, in which openings it is designed to have a fairly close fit, until said rod and blocks are in the relative positions shown in Fig. 2. The provision of the bevelled end portion 2' on the carbon rod, facilitates the carrying out of the operation just described. It will be noted that the carbon rod 2 is enveloped by the depolarizing body 3 for about three-quarters of its length and has the upper end portion thereof extending above such body. Disposed at the bottom of the can 1 is a fairly thick member 7 made of paper, fabric or other suitable insulating material, preferably in the form shown. The member 7 has four long arms or extensions 7' spaced 90 degrees apart, which are bent as shown so as to extend upwardly for a considerable distance in engagement with the side wall of the can. This member 7 acts to centralize the bobbin or cartridge, consisting of the rod 2 and paper or cloth enclosed depolarizing body 3, in the can 1 upon the insertion thereof into said can and thereafter serves to insulate said bobbin from the bottom 1' of the can and to maintain it so centralized. The free space between the bobbin or depolarizing electrode assembly is filled with the electrolyte paste 4 to a level at least even with and preferably slightly above the upper end of the body 3 of depolarizing material. The paste 4 may be formed of a suitably proportioned mixture of starchy material such as wheat flour, karaya gum, ammonium chloride, zinc chloride and water.

A thin elastic diaphragm 8 substantially impervious to liquids and gases and constituting the inner seal of the cell, is disposed just above the electrolyte paste 3 and forms substantially fluid-tight joints both with the carbon rod 2 and the inner wall surface of the container 1. This diaphragm or seal may be made in various ways. For example, it may be formed of very thin sheet rubber cut in the form of an annular disc and having the edge of the central opening therein cemented to the carbon rod 2 and its outer edge cemented to the wall of the container 1; or it may be formed of some compound, which when heated may be poured in a thin layer immediately above the depolarizing material and electrolyte paste and will subsequently cool in coherent and elastic form. Gum rubber dissolved in a suitable solvent is one such compound. This diaphragm seal may also be made of any of a number of different pitch compounds, which while in a hot molten condition may be poured on top of the body of electrolyte paste to produce a thin layer and which upon cooling will have the desired coherency and elasticity. There are numerous pitches having a high degree of elasticity which may advantageously be employed producing such a compound, no particular preference being expressed for one of such pitches over another for this purpose.

A heavy paper or cardboard disc 9 of such diameter as to have a friction-tight fit with the inside of can 1, is disposed within the latter at a distance below the top thereof substantially equal to the thickness of the outer seal of the cell. This disc has a central aperture through which the carbon rod 2 extends to a point which is preferably somewhat more than half the distance between said disc and the top of the can. A space or expansion chamber 10 is provided between the inner seal 8 and the disc 9 which may either be left free and open, or which may be filled with a mass of loose porous material as has heretofore been customary in dry cells of the type where no inner elastic seal is employed and where such material has constituted an inefficient means for absorbing gases and for preventing the escape of moisture liberated from the subjacent active materials during discharging of the cell.

Instead of the usual form of outer seal consisting of a single thick layer of a hard compound of rosin and a filler material, or the like, I provide an improved composite or double-layer seal comprising a relatively soft adhesive lower layer 11, a hard upper layer 12 and a member 13 of thin material which is substantially impervious to liquids disposed between and partially separating said layers 11 and 12. The member 13 is preferably in the form of a loose-fitting disc of flexible sheet material such as paper. There are various substances which are suitable for the layers 11 and 12. When the lower layer 11 is made of a soft pitch compound, it will have such adhesive qualities that it will form very effective fluid-tight joints both with the zinc container 1 and the carbon rod 2. The upper layer 12 is preferably formed of the usual cell sealing composition comprising rosin and an inert filler, such as talc and silica, combined in such proportions that it will, when set, be strong, hard and rigid. In producing my improved double-layer outer seal, a suitable soft pitch compound in a hot molten condition is first poured on top of the disc 9 in an amount sufficient to about half fill the space between such disc and the top edge of the container 1. The disc 13 is then disposed on the layer of the soft pitch compound, after which the compound used for the upper layer 12 is poured while in a hot molten condition on to the disc 13 until it reaches a level inside cross-sectional area of container 1, the disc 9 serves to support the outer seal until the upper and lower layers thereof cool and set. The area of disc 13 is considerably less than the inside cross-sectional area of container 1, the diameter of the disc being somewhat less than the inside diameter of the container and said disc having a central circular opening 14 which is somewhat larger than the cross-sectional area of the carbon rod 2 and through which the latter extends. The provision of the substantially liquid impervious disc 13 is an important feature of my invention, as will hereinafter appear.

The rod 2 is of such length that it terminates at its upper end in the outer seal at a point slightly above the disc 13. The hard strong layer 12 of said seal accordingly cooperates with rod 2 to maintain the upper end portion thereof firmly centralized with respect to the container 1.

The upper end portion of rod 2 has an axially extending recess 15 which is engaged with a drive fit by the lower fluted end portion 16 of a conductive metal rod 17 constituting the positive terminal post of the cell. Intermediate its length rod 17 has a collar or flange 18 which limits the distance the rod is driven into rod 2 by its engagement with the upper end of the latter. The upper end portion of terminal post 17 is threaded and extends to a point considerably above the layer 12 of the outer seal. Adjustably mounted on such threaded portion of terminal post 17 is a conductive member 19 in the form of a nut, with which a binding nut 20 is adapted to cooperate to secure a conductor therebetween and in electrical connection with said terminal post. To insure that the nut 20 may, whenever desired, be brought into proper cooperative relation with member 19, and also for the purpose of a neat appearance to the cell, said member should be maintained in a position with respect to post 17 where its upper surface is exposed on a level just slightly above the top of the outer seal. With the construction just described, the member 19 may be easily and quickly adjusted to such position, regardless of such variations in the dimensions and location of parts as may be due to manufacturing and assembling operations, such for example as variations in the location of disc 9, in the thickness of the outer seal, in the length of the carbon rod, etc., merely by turning such member on the threaded portion of post 17 in one direction or the other. Such adjustment of member 19 is made just prior to pouring into position the hot compound from which the upper layer 12 of the outer seal is formed. Accordingly, when this upper layer cools, sets and hardens, it will act to hold the member 19 firmly in the desired position.

A conventional form of binding post 21 constituting the negative terminal of the cell, is fixedly attached to the zinc can 1 at the upper end portion thereof and has the usual binding nut 22 threaded thereon.

The dry cell described may be inserted into a snugly fitting pasteboard carton 23 having a bottom closing cap 23'. If desired, the carton 23 may also be provided with a top cap 23'', although this is not necessary and may be omitted.

My improved sealing construction comprising the inner elastic seal or diaphragm 8 and the outer compound seal, together with the intervening expansion chamber 10, provides means which is highly effective in preventing the escape of moisture from the active materials of the cell to the outside atmosphere. Accordingly, dry cells having this sealing construction will not dry out nearly as fast on prolonged standing as do dry cells sealed in the manner heretofore customary. In this connection, it is to be noted that since the inner seal 8 is elastic, it can yield and stretch under the influence of any accumulation of internal gases formed below it during periods of discharge of the cell, the expansion chamber 10 permitting such seal to bulge upwardly; while during subsequent periods of comparative inactivity when such gases are absorbed to a considerable extent by the active materials, such seal will tend to return to its original form and position. The introduction of the elastic inner seal therefore in no way interferes with the ability of the cell to react to the necessities of the situation relative to internal gases. While this inner seal acts to restrict the escape of accumulations of gas liberated from the active materials of the cell during discharging operations, it also, and this is far more important, greatly restricts the escape of moisture from the active materials. Even though the hard upper layer 12 of the outer seal should crack or shrink away from the wall of can 1, the comparatively soft lower layer 11 will act as a very effective guard against the escape to the outside atmosphere of any internal moisture which may have been liberated or expelled from the active materials of the cell and which may have either leaked past or through the diaphragm 8 or penetrated through the carbon rod 2 into the chamber 10. Accordingly, it is apparent that the construction described is very effective in retaining within the cell the internal moisture thereof, which is essential in order to obtain maximum usefulness from the cell.

The compound outer seal combines all the desirable properties of a seal formed of a hard tough rosin compound such as is ordinarily employed, and a seal which is sufficiently adhesive to form permanently fluid-tight joints with the zinc container and carbon electrode rod; while at the same time the disadvantages of both of the latter types of seals are obviated. The hard upper seal layer 12 provides a neat and attractive finish for the top of the cell and imparts great mechanical strength to the compound seal so that despite the presence of the expansion chamber 10, the seal will not "sink" when the cell is subjected to rough usage or excessive vibration; while the comparatively soft lower layer 11 will not crack or break but retains its adhesive and sealing qualities even though the upper layer should crack or shrink away from the can 1 or the rod 2 or terminal post 17. The presence of the lower layer 11 also renders the hard upper layer 12 less apt to crack and break. The separating member or disc 13 disposed between the layers 11 and 12, is an extremely important feature of the outer seal construction. In fact, the use of such a separating member is essential for the attainment of the desired results. When no such separating member is employed, the desirable properties of both of the compounds used for the upper and lower layers 11 and 12 are partially lost. This is due to the fact that these compounds are introduced into the cell in a hot molten condition and consequently tend to become mixed before they have had time to cool and set. Also when the separating member is omitted, the finish of the cell at the top is very inferior, presenting a rough and uneven appearance. These objections are entirely eliminated by the use of the separating member, the lower comparatively soft layer retaining its adhesive qualities and the upper layer presenting a smooth, neat and finished appearance. At the same time, due to the spacing of the outer edge of the separating member 13 from the adjacent side wall of container 1 and the spacing of the edge of the opening 14 in such member from the rod 2, the materials of the two layers become firmly bonded to form a unitary, strong and durable outer seal.

It is to be understood that the cell structure herein specifically described is subject to various changes and modifications without departure from the spirit of my invention or the scope of the appended claims.

What I claim is:

1. In a dry cell, a container having an open end, an electrode element within the container, an electrolyte material partially filling the container and disposed about the electrode element and above which the latter extends, an inner seal comprising a diaphragm of elastic material substantially impervious to liquids and gases disposed just above the electrolyte material and forming fluid-tight joints with the electrode element and the container, and an outer composite seal for the open end of the container spaced from said inner seal to provide a chamber, the electrode element extending into said outer seal, the said outer seal comprising an inner layer of relatively soft adhesive material forming substantially fluid-tight joints with the container and with the electrode element and an outer layer of relatively hard material.

2. In a dry cell, a container having an open end, an electrode element within the container, an electrolyte material partially filling the container and disposed about the electrode element and above which the latter extends, an inner seal comprising a diaphragm of elastic material substantially impervious to liquids and gases disposed just above the electrolyte material and forming fluid-tight joints with the electrode element and container, and an outer composite seal for the open end of the container spaced from said inner seal to provide a chamber, the electrode element extending into said outer seal, the said outer seal comprising an inner layer of relatively soft adhesive material forming substantially fluid-tight joints with the container and with the electrode element, an outer layer of relatively hard material and a substantially liquid impervious member disposed between the said inner and outer layers.

ALBERT I. EDDY.

CERTIFICATE OF CORRECTION.

Patent No. 2,175,686. October 10, 1939.

ALBERT I. EDDY.

It is hereby certified that error appears in the printed specification of the above numbered patent requiring correction as follows: Page 2, second column, line 54, for the words "inside cross-sectional area of container 1, the" read flush with the top edge of container 1. The; and that the said Letters Patent should be read with this correction therein that the same may conform to the record of the case in the Patent Office.

Signed and sealed this 26th day of December, A. D. 1939.

(Seal)

Henry Van Arsdale,
Acting Commissioner of Patents.